United States Patent

Gray et al.

[11] 4,219,256
[45] Aug. 26, 1980

[54] LIQUID CRYSTAL COMPOUNDS AND MATERIALS AND DEVICES CONTAINING THEM

[75] Inventors: George M. Gray, Cottingham; Stephen M. Kelly, Hull; Damien G. McDonnell, Malvern; Alan Mosley, Reading, all of England

[73] Assignee: The Secretary of State for Defence in Her Brittanic Majesty's Government of the United Kingdom of Great Britain and Northern Ireland, London, England

[21] Appl. No.: 62,624

[22] Filed: Aug. 1, 1979

[51] Int. Cl.$^2$ .................. C02F 1/13; C09K 3/34; C07C 121/60; C07C 121/64
[52] U.S. Cl. ..................... 350/346; 252/299; 252/408; 260/465 R; 260/465 C; 350/330
[58] Field of Search ............. 252/299, 408; 350/346, 350/350; 260/465 R, 465 F, 465 D, 465 C

[56] References Cited

U.S. PATENT DOCUMENTS

| | | | |
|---|---|---|---|
| 3,947,375 | 3/1976 | Gray et al. | 252/299 |
| 4,130,502 | 12/1978 | Eidenschink et al. | 252/299 |
| 4,154,697 | 5/1979 | Eidenschink et al. | 252/299 |

FOREIGN PATENT DOCUMENTS 2136  5/1979  European Pat. Appl. ............ 252/299

OTHER PUBLICATIONS

Dewar, M. J. S., et al., J. Am. Chem. Soc., vol. 92, No. 6, pp. 1582–1586 (1970).
Gray, G. W., et al., Liquid Crystals & Plastic Crystals, vol. 1, John Wiley & Sons, Inc., New York, pp. 113–114 (1974).

Primary Examiner—Teddy S. Gron
Attorney, Agent, or Firm—Stevens, Davis, Miller & Mosher

[57] ABSTRACT

A novel liquid crystal compound has the molecular structure:

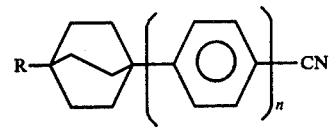

where R is an alkyl group, which may contain up to 18 carbon atoms and which may be normal or branched and may contain a chiral center,

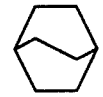

is a bicyclo (2.2.2) octane ring,

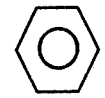

is a phenyl ring and CN is a cyano group, n being an integer greater than 0 preferably 1 or 2.

The compound may be used in mixtures with other liquid crystal compounds in the same or other families and the compound or mixtures may be used in known liquid crystal devices, eg the twisted nematic and cholesteric-to-nematic phase change devices, depending on its properties.

30 Claims, 3 Drawing Figures

LIQUID CRYSTAL COMPOUNDS AND MATERIALS AND DEVICES CONTAINING THEM

The present invention relates to liquid crystal compounds and materials and devices containing them.

In the field of displays there is a requirement for electro-optic devices having a low power consumption. Devices incorporating liquid crystal materials have been shown to satisfy this requirement because they have an electrically switchable molecular arrangement and a very large electrical resistance, and at the present time a considerable amount of interest is being shown in such devices for these reasons.

There are many known liquid crystal materials; some have been known for many years. Liquid crystal materials are organic materials which exhibit a liquid crystal phase in which the molecules are arranged over limited spatial ranges in an ordered structure.

The materials may be single compounds or mixtures of compounds.

According to the present invention there is provided a liquid crystal compound having the following molecular structure:

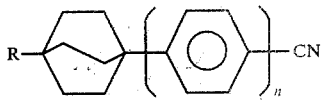
(I)

where R is an alkyl group,

is a bicyclo (2,2,2) octane ring,

is a phenyl ring, CN is a cyano group and n is an integer greater than 0.

A compound (or compounds) having molecular structure (I) will be referred to as a compound (or compounds), as defined.

The alkyl group R preferably contains less than eighteen carbon atoms, e.g. one to ten carbon atoms, and may be normal or branched. If R is branched it may contain a chiral centre in which case the compound is optically active.

Preferably n is 1 or 2 so that the compound is either

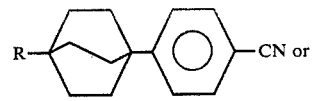

or

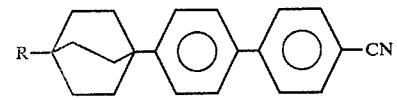

By a 'liquid crystal compound' is meant a compound in one of the following two known categories:

(i) Compounds which normally exhibit a liquid crystal phase;

(ii) Compounds which do not normally exhibit a liquid crystal phase but which nevertheless usefully affect some aspect of liquid crystal behaviour when dissolved in other liquid crystal compounds.

Compounds in category (ii) show a 'monotropic' or 'virtual' liquid crystal to isotropic liquid transition at a temperature below the melting point of their solid phase. The monotropic or virtual transition may be detected respectively by rapid cooling of the liquid phase or by dissolving the compound in a material exhibiting a liquid crystal phase, observing the change in the transition to the isotropic liquid phase of the material by the addition and calculating the virtual transition temperature by extrapolation.

Compounds in category (ii) might be example by usefully dissolved in other liquid crystal compounds to extend or vary the liquid crystal temperature ranges of the compounds or to vary the molecular helical pitch (in the case of 'cholesteric' liquid crystals).

Material which exhibits a liquid crystal phase and either consists of or contains a compound as defined above will be referred to herein as a material 'as defined'.

The liquid crystal phase exhibited by the material as defined may be nematic, smectic or cholesteric.

For a nematic phase the compound as defined should have a normal alkyl group R whilst for a cholesteric phase the compound as defined should have a branched alkyl group R containing a chiral centre.

Preferably compounds as defined are prepared from the intermediate bromo compound

e.g. by one of the following routes

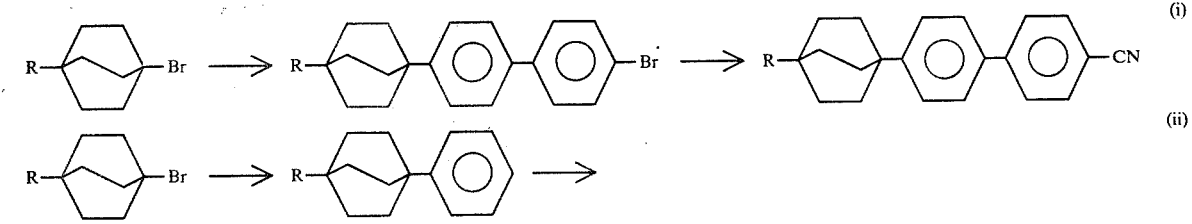
(i)
(ii)

-continued

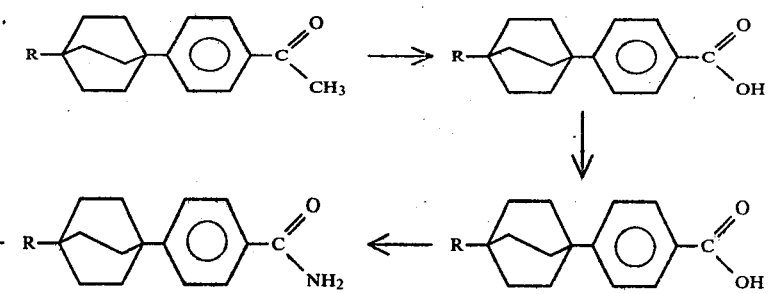

A compound as defined may be mixed with one or more other compounds as defined to enhance its liquid crystal properties, e.g. to extend its liquid crystal temperature range.

For example the following are examples of such mixtures:

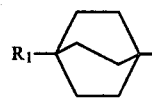 (i)

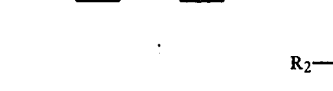

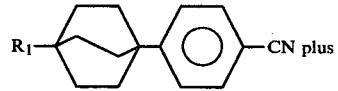 (ii)

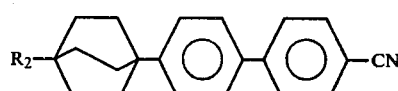

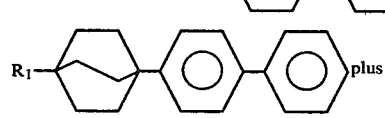 (iii)

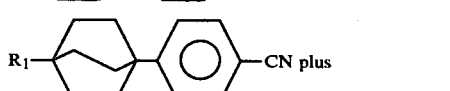

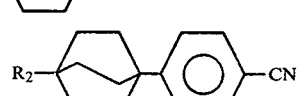

$R_1, R_2, R_3 =$ alkyl $R_1 \neq R_2$

Likewise, compounds as defined may be mixed with one or more of the compounds in the following categories:

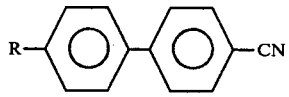 (i)

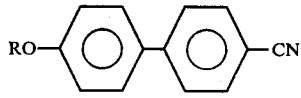 (ii)

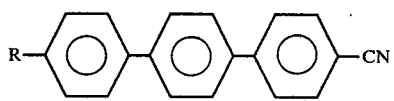 (iii)

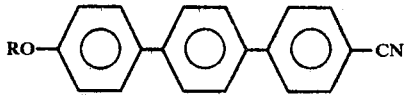 (iv)

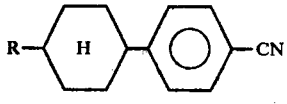 (v)

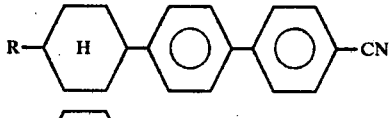 (vi)

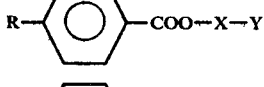 (vii)

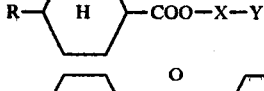 (viii)

 (ix)

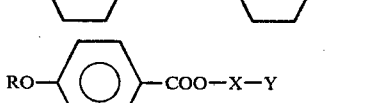 (x)

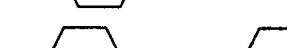 (xi)

 (xii)

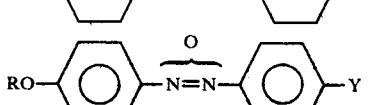 (xiii)

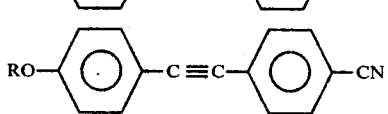 (xiv)

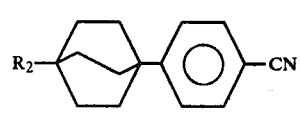 (xv)

where

is a cyclohexane ring, X is a 1,4 phenylene group

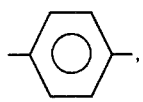

or a 4,4' biphenyl group

or a 2,6 naphthyl group

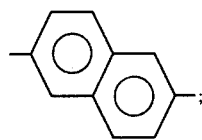

and Y is CN, or $R^1$, or $OR^1$ or $CO.O-X-Y^1$ where $Y^1$ is CN, or $R'$ or $OR'$; the definition of $R'$ being the same as that of R.

According to another aspect of the present invention a liquid crystal device includes means for containing a region of liquid crystal material, a region of liquid crystal material contained in the containing means, wherein the liquid crystal material is material as defined above, and means for applying an external stimulus to the material to alter the molecular arrangement in the material.

The means for applying an external stimulus may for example be means for applying an electric field to the region.

The change in molecular arrangement produced by the external stimulus may be used to affect the transmission of electromagnetic radiation at any wavelength of interest through the material, for example, by changing the transmissitivity of the material or by changing the helical order of the material, if it is optically active.

According to another aspect of the invention, an electro-optic liquid crystal device includes two adjacent substrates at least one of which is optically transparent, a layer of liquid crystal material contained in the space between the substrates wherein the liquid crystal material is the material as defined above, and deposited on the inner facing surfaces of the substrates, a film of conducting material to allow an electric field to be applied across the layer. The electro-optic device may for example be a display device used, for instance, in an instrument such as a time watch or clock. The device may be of known 'twisted nematic' effect or '(cholesteric-to-nematic) phase change' effect types.

Examples of methods of preparing compounds as defined will now be described. In these examples 'MP' represents melting point, 'C-N' represents crystalline to nematic liquid crystal transition temperature and 'N-I' represents nematic liquid crystal to isotropic liquid transition temperature.

EXAMPLE 1

The intermediate compound 1-bromo-4-alkyl substituted bicyclo [2,2,2] octane which is used in the preparations described below may be prepared by the following route:

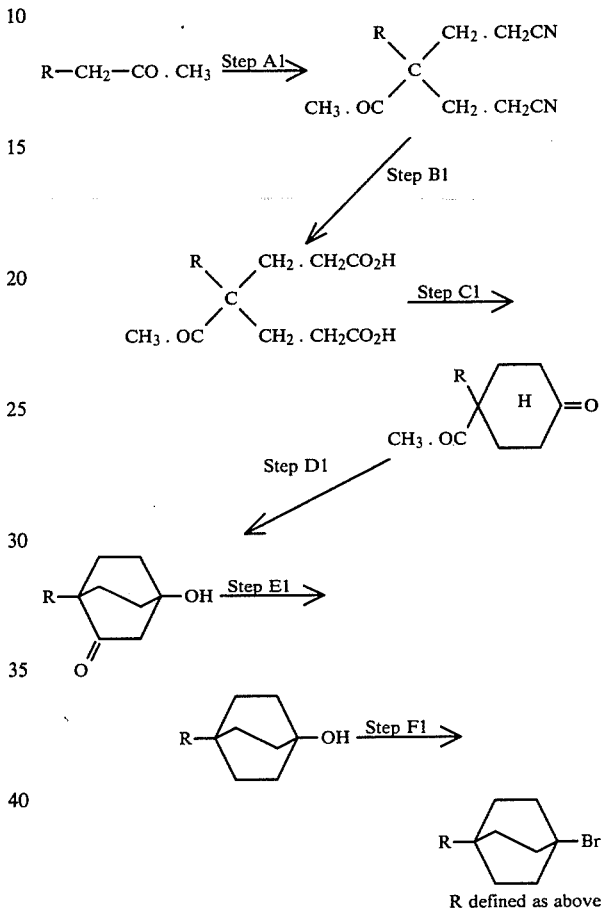

R defined as above

STEP A1: The production of 3-acetyl-1,5-dicyano-3substituted pentane.
STEP B1: The production of 3-acetyl-3-substituted pentane-1,5-dicarboxylic acid.
STEP C1: The production of 4-acetyl-4-substituted cyclohexanone.
STEP D1: The production of 4-hydroxy-1-substituted bicyclo [2.2.2] octan-2-one.
STEP E1: The production of 1-hydroxy-4-substituted bicyclo [2.2.2] octane.
STEP F1: The production of 1-bromo-4-substituted-bicyclo [2.2.2] octane.

All six of these steps may be carried out by methods essentially analogous to those for R=methyl and ethyl described by H. D. Holtz and L. M. Stock in the Preparation of 1-Carboxy-4-Substituted Bicyclo [2.2.2] Octanes, J. Am. Chem. Soc, 86, 5183 (1964).

EXAMPLE 2

The production of 4-alkyl substituted 1-(4'-cyano-4"-biphenylyl) bicyclo [2.2.2] octane by the following route:

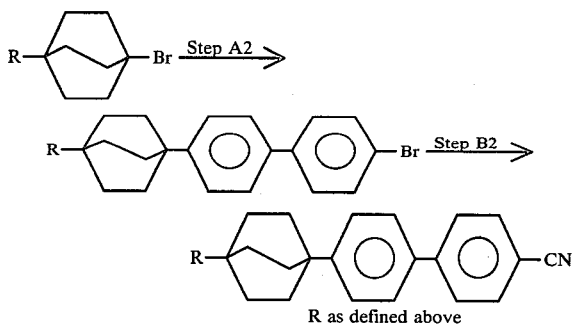

STEP A2: The production of 1-(4'-bromo-4''-biphenylyl)-4-substituted bicyclo [2.2.2] octane.

A solution of 1-bromo-4-substituted bicyclo [2.2.2] octane (0.0039 mole) in dry nitrobenzene (15 cm³) is added dropwise over a period of thirty minutes to a well stirred solution of crushed anhydrous aluminium chloride (0.0016 mole) and 4-bromobiphenyl (0.0116 mole) in dry nitrobenzene (25 cm³) maintained at 80° C. under anhydrous conditions. The mixture is kept at this temperature for five hours. It is then left stirring at room temperature, e.g. overnight. It is then added to a small amount of a hydrochloric acid/ice/water mixture and stirred for about twenty minutes. The organic layer is separated off and steam distilled to remove the solvent and 4-bromobiphenyl. The residue is dissolved in toluene and the solution so formed is dried over magnesium sulphate. It is then filtered and evaporated to dryness under vacuum. The solid residue is crystallised from ethanol and toluene. When R=pentyl, the product of this step has C-N=192.0° C. and N-I=231.2° C.

STEP B2: The production of 1-(4'-cyano-4''-biphenylyl)-4-substituted bicyclo [2.2.2] octane.

A solution of 1-(4'-bromo-4''-biphenylyl)-4-substituted bicyclo [2.2.2] octane (0.0019 mole) in dry 1-methyl-2-pyrrolidinone (5 cm³) is heated at 180° C. with anhydrous copper (I) cyanide (0.0039 mole) for two hours under anhydrous conditions. The mixture is allowed to cool and then added to a solution of anhydrous iron (III) chloride (0.35 g) in water (5 cm³) with concentrated hydrochloric acid (0.5 cm³). This is stirred for twenty minutes at 50° C. and then water is added (50 cm³). This mixture is shaken several times with ether and then the combined organic layers are dried over magnesium sulphate. The solution is filtered and evaporated to dryness under vacuum. The product is purified by column chromatography using silica-gel with a chloroform/hexane mixture as eluent. It is finally crystallised from 2-methoxy-ethanol.

An example of such a product is:

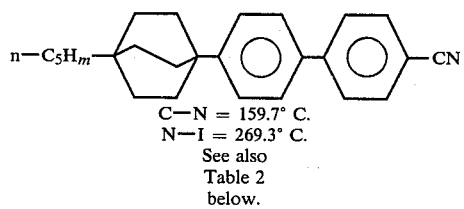

C—N = 159.7° C.
N—I = 269.3° C.
See also
Table 2
below.

EXAMPLE 3

The production of 1-[4'-cyanophenyl]-4-alkyl substituted bicyclo [2.2.2] octane by the following route:

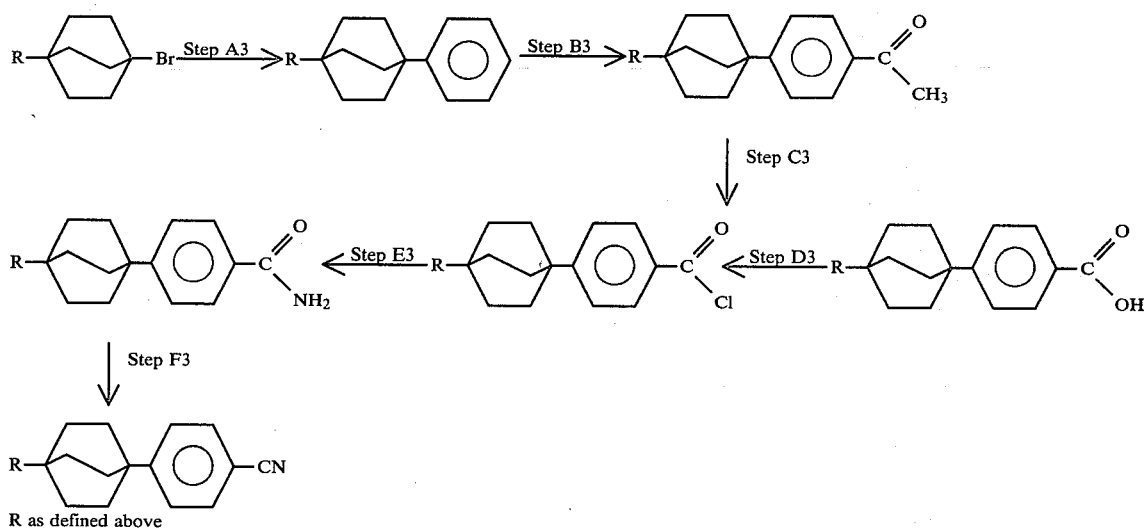

R as defined above

STEP A3: The production of 1-phenyl-4-substituted bicyclo [2.2.2] octane may be carried out by a reaction which is analogous to that described by S. Sotheeswara, Ph D Thesis, Hull University Library 1967. When R=pentyl the product of this step has M.P.=37° C.

STEP B3: The production of 4'-(4-substituted 1-bicyclo [2.2.2] octyl)acetophenone.

A solution of acetyl chloride (0.0077 mole) in dry nitrobenzene (3 cm³) is added dropwise to a well stirred solution of 4-substituted 1-phenylbicyclo [2.2.2] octane (0.007 mole) and crushed anhydrous aluminium chloride (0.0082 mole) in dry nitrobenzene (7 cm³) at 0° C. This solution is left stirring, e.g. overnight, at room temperature. It is then added to a small amount of a hydrochloric acid/ice/water mixture and stirred for 30 minutes. The organic layer is separated off and steam distilled. The solid residue is taken up in chloroform and the resultant solution dried over magnesium sulphate. It is then filtered and evaporated to dryness under vacuum to give a solid. This is crystallised from a methanol/e- thanol mixture. When R=pentyl the product of this step has M.P.=81° C.

STEP C3: The production of 4'-(4-substituted 1-bicyclo [2.2.2] octyl) benzoic acid.

A solution of sodium hypobromite, prepared by dissolving bromine (0.0168 mole) in a solution of sodium hydroxide (0.0570 mole) in water (15 cm³) at 0° C., is added to a well stirred solution of 4'-(4-substituted 1-bicyclo [2.2.2] octyl)acetophenone, prepared in step B3, in dioxan (15 cm³). Throughout the addition and for thirty minutes afterwards the temperature is maintained at 35°–40° C. The excess of sodium hypobromite is destroyed by adding a solution of sodium metabisulphite in water. More water is added and bromoform distilled from the reaction mixture. On cooling, the solution is acidified with concentrated hydrochloric acid and the precipitated product filtered off and washed with water.

The product was crystallised from a methanol/ethanol mixture. When R=pentyl the product of this step has C-N=226.7° C.; N-I=288.7° C.

STEP D3: The production of 4'-(4-substituted 1-bicyclo [2.2.2] octyl)benzoylchloride.

A solution of 4'-(4-substituted-1-bicyclo [2.2.2] octyl) benzoic acid prepared in Step C3 (0.0017 mole) in dry toluene (10 cm³) is heated under reflux with thionyl chloride (1 cm³) for one hour under anhydrous conditions and then allowed to cool. The mixture is evaporated to dryness and then more dry toluene (10 cm³) is added. The resultant solution is again evaporated to dryness under vacuum. The acid chloride residue is used in the step E3 without further purification.

STEP E3: The production of 4'-(4-substituted 1-bicyclo [2.2.2] octyl)benzamide.

A solution of the acid chloride prepared in step D3, in dry benzene (10 cm³) is added dropwise to a well stirred ammonia solution (10 cm³ d=0.88). The resultant precipitate is collected (with some difficulty) and washed with water. It is crystallised from a water/ethanol mixture at 0° C. When R=pentyl the product of this step has M.P.=247.3° C.

STEP F3: The production of 1-(4'-cyanophenyl)-4-substituted bicyclo [2.2.2] octane.

A solution of 4'-(4-substituted 1-bicyclo [2.2.2] octyl)-benzamide (0.0010 mole) in chloroform (18 cm³) is stirred for one hour with a solution of sodium hydroxide (0.0750 mole) in water (3 cm³) and 0.02 g of benzyltriethylammonium hydroxide. The mixture is gently heated for fifteen minutes in a warm water bath and then allowed to cool. Ether (40 cm³) and water (40 cm³) are added. The organic layer is separated off, washed with water and then dried over magnesium sulphate. The solution is filtered and evaporated to dryness under vacuum. The solid residue is purified by column chromatography using silica gel with chloroform as eluent. It is then crystallized from light petroleum (b.p. 40–60).

An example of the product of this step is

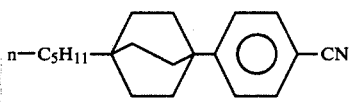

which has C-N=62° C., N-I=100° C. (See also Table 1 below).

The following tables give examples of the liquid crystalline temperature ranges of compounds and mixtures embodying the invention. In the tables R represents a normal alkyl group having the stated composition, C-N represents solid crystal to nematic liquid crystal transition temperature (°C.), C-I represents solid crystal to isotropic liquid transition temperature (°C.) and N-I represents nematic to isotropic liquid transition temperature (°C.).

Table 1

Compounds having the formula

R—◇—◯—CN

| R | C—N or I | N—I |
|---|---|---|
| CH₃ | 93 (C—I) | (−35)* |
| C₂H₅ | 62.5 (C—I) | (17)* |
| n-C₃H₇ | 66.5 (C—N) | 88 |
| n-C₄H₉ | 75.5 (C—N) | 85 |
| n-C₅H₁₁ | 62 (C—N) | 100 |
| n-C₆H₁₃ | 72 (C—N) | 86 |
| n-C₇H₁₅ | 61 (C—N) | 95 |

( )* represents a monotropic 'virtual' transition temperature obtained by studying suitable binary mixtures of each compound with a standard material.

( )* represents a monotropic 'virtual' transition temperature obtained by studying suitable binary mixtures of each compound with a standard material.

Further examples are

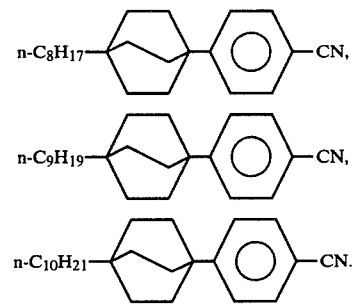

Optically active analogues, e.g.

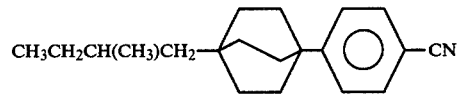

may be prepared by an analogous route.

Table 2

Compounds having the formula

R—◇—◯—◯—CN

| R | C—N or I | N—I |
|---|---|---|
| CH₃ | 198 (C—I) | (170)* |
| C₂H₅ | 188 (C—N) | 221 |
| n-C₃H₇ | 180.5 (C—N) | 276 |
| R | C—N | N—I |
| n-C₄H₉ | 173 (C—N) | 271.5 |
| n-C₅H₁₁ | 159 (C—N) | 269 |
| n-C₆H₁₃ | 133 (C—N) | 259 |
| n-C₇H₁₅ | 141 (C—N) | 250.5 |

( )* represents a monotropic 'virtual' transition temperature obtained by studying suitable binary mixtures of each compound with a standard material.

( )* represents a monotropic 'virtual' transition temperature obtained by studying suitable binary mixtures of each compound with a standard material.

Further examples are

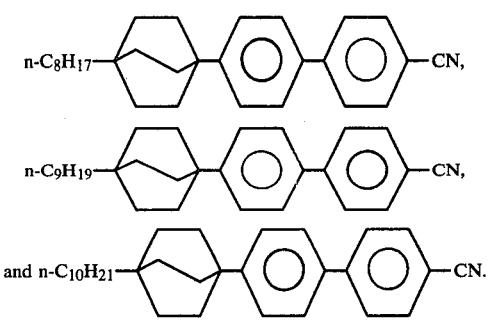

Optically active analogues e.g.

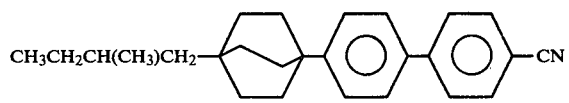

may be prepared by an analogous route.

Although departures from ideality are known, examples of eutectic or nearly eutectic mixtures embodying the invention are quoted (Tables 3-6) as exemplifying the application of the above compounds in Tables 1 and 2.

Table 3

| Mixture Constituent | The following mixture: Mole % | C—N |
|---|---|---|
| 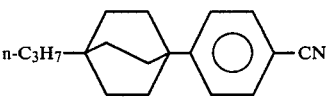 n-C$_3$H$_7$—...—CN | 51.0 | 33.3 |

Table 3-continued

| Mixture Constituent | The following mixture: Mole % | C—N |
|---|---|---|
| n-C$_5$H$_{11}$—...—CN | 49.0 | |

Table 4

| Mixture Constituent | The following mixture: Mole % | C—N |
|---|---|---|
| n-C$_3$H$_7$—...—CN | 38.0 | 20.8 |
| n-C$_5$H$_{11}$—...—CN | 34.9 | |
| n-C$_6$H$_{13}$—...—CN | 27.1 | |

Table 5

| Mixture Constituent | The following mixture: Mole % | C—N |
|---|---|---|
| n-C$_3$H$_7$—...—CN | 37.9 | 20.6 |
| n-C$_5$H$_{11}$—...—CN | 34.4 | |
| n-C$_6$H$_{13}$—...—CN | 27.0 | |
| n-C$_4$H$_9$—...—CN | 0.7 | |

Table 6

| Mixture Constituent | The following mixture: Mole % | C—N |
|---|---|---|
| n-C$_3$H$_7$—...—CN | 19.9 | −3.5 |
| n-C$_5$H$_{11}$—...—CN | 16.2 | |

Table 6-continued

The following mixture:

| Mixture Constituent | Mole % | C—N |
|---|---|---|
| 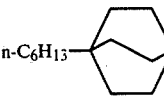 n-C$_6$H$_{13}$—[bicyclo]—[phenyl]—CN | 12.3 | |
| 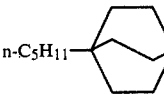 n-C$_5$H$_{11}$—[bicyclo]—[phenyl]—CN | 51.6 | |

In addition the bicyclo-octane compounds embodying the invention may be mixed with any of the compounds in one or more of the other classes listed above.

A liquid crystal device embodying the invention will now be described by way of example only with reference to the accompanying drawings of which:

Figure 1:
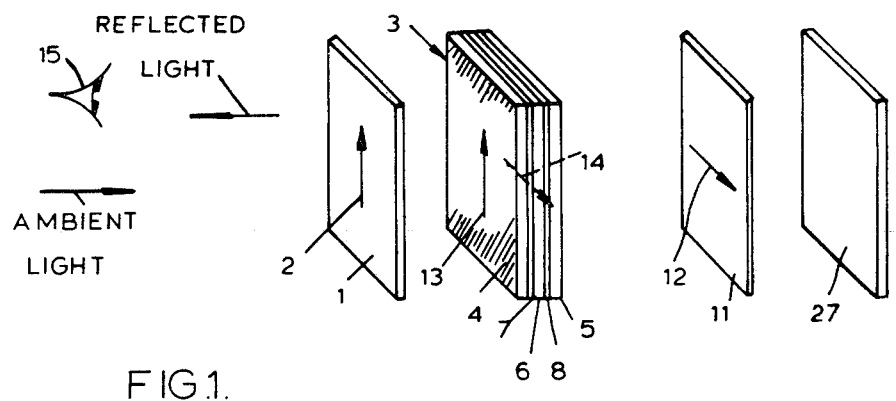
FIG. 1 is an exploded view of a twisted nematic display.

As shown in FIG. 1 a 'twisted nematic' type display includes a polariser 1 arranged with its polarisation axis 2 vertical. A liquid crystal cell 3 comprises two glass slides 4, 5 containing a layer of liquid crystal 6, consisting basically of a nematic material which may contain a small proportion (e.g. 1%) of a cholesteric compound. Electrodes 7, 8 e.g. of tin oxide, are arranged on the inner faces of the slides 4, 5. Behind the cell 3 is an analyser or second polariser 11 arranged with its polarisation axis 12 horizontal. A brushed aluminium reflector 27 is behind the analyser 11.

Prior to assembling the cell the slides 4, 5 are coated on their inner faces with silicon monoxide or magnesium fluoride. This coating is formed by evaporating a stream of e.g. silicon monoxide onto the slide at an angle of about 5° C. to the surface as for example described in UK Patent Specification No. 1,454,296. On assembly the slides are arranged with the evaporation direction on the two slides 4, 5 at 90° to one another. With such a coating liquid crystal molecules at the coated surface lie in a single direction (parallel to the evaporation direction) and at an angle of about 25° to 35° typically about 30° to the slide surface. As a result the liquid crystal molecules progressively twist from one slide 4 to the other slide 5. Thus the plane of plane polarised light is rotated through 90° on passing through the cell 3 providing the direction 13 of the molecules at the surface of the slide 4, 5 is parallel (or perpendicular) to the polarisers axis 2, 12 respectively. Thus when zero voltage is applied to the cell light passes through the analyser 1, cell 3 and analyser 11, and is then reflected back to an observer 15.

When a suitable voltage is applied between the electrodes 7, 8 the molecules between the electrodes are caused to align parallel to the applied field and light transmitted by the polariser is transmitted without rotation to the analyser 11. Since the polariser and analyser 11 are crossed no light is transmitted to the reflector and no light is reflected back to the observer at those parts of the cell 3 between electrodes 7, 8 which therefore appear dark on a lighter background. Thus by shaping each electrode 7, 8 into say seven discrete parts separately connectable to a voltage source the numbers 0 to 9 may be displayed.

Figures 2, 3:
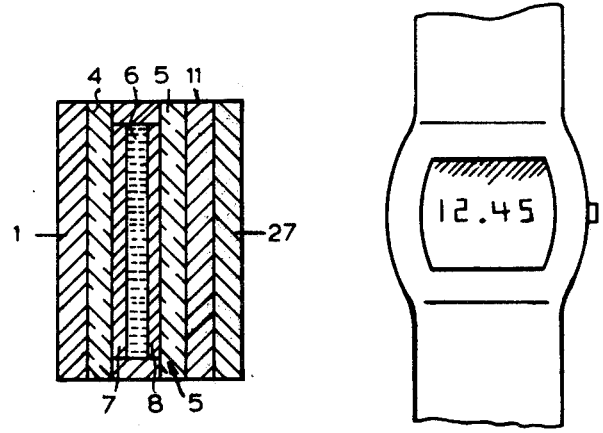
FIG. 2 is a front view of a watch having a twisted nematic liquid crystal display constructed as shown in FIG. 1.
FIG. 3 is a sectional view of the display part of the watch in FIG. 2 but drawn to an enlarged scale.

In the watch display of FIGS. 2, 3 the electrodes 7, 8 are arranged to provide four seven bar numeric characters plus a period dot which may be arranged to pulse once per second.

The voltage required to align the molecules parallel to the applied field, is the 'ON' state, is dependent on layer 6 thickness, materials used, temperature and surface treatment of the slides 4, 5. A typical thickness of layer is 12 μm. The material used must be stable over the temperatures of use i.e. ambient temperatures which can be assumed constant for comparison purposes. A surface treatment i.e. evaporation of silicon monoxide at 5° giving large tilt e.g. 30° of molecules reduces the voltage necessary to turn the cell 'ON' at the expense of a degraded contrast or speed.

In typical watch displays using twisted nematic liquid crystal displays a 1.5 volt battery is used to drive the oscillator and logic circuits of the watch and an up converter is used to raise the voltage to 3.0 volts for operating the display.

Material embodying the invention suitable for use as the liquid crystal 6 is:

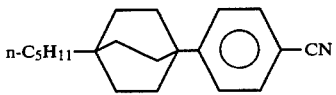 n-C$_5$H$_{11}$—[bicyclo]—[phenyl]—CN  10% by weight

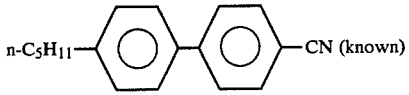 n-C$_5$H$_{11}$—[phenyl]—[phenyl]—CN (known)  89% by weight

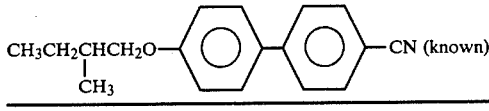 CH$_3$CH$_2$CHCH$_2$O—[phenyl]—[phenyl]—CN (known)  1% by weight
      |
      CH$_3$ Liquid crystal compounds and mixtures embodying the invention may also be used in known phase change effect devices in which an optically active material is normally mixed with a nematic material to give a long helical Pitch cholesteric material which may be switched to a nematic state by the action of an electric field applied in a way similar to that described above in relation to the twisted nematic device. An example of a phase change effect device is described in UK Patent No. 1,433,130. The compounds or mixtures embodying the invention may comprise either the nematic material (if R is n-alkyl) or the optically material (if R is a chiral alkyl group) or both to form the long pitch cholesteric material. The material may be dyed with any known suitable pleochroic dye to give enhanced contrast. Compounds and mixtures embodying the invention are particularly suitable in phase change devices in view of their low birefringence.

We claim:

1. A liquid crystal compound having a molecular structure

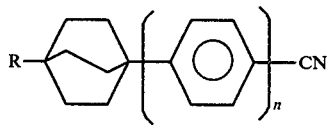

where R is an alkyl group and

is a bicyclo (2.2.2) octane ring, n being an integer greater than zero.

2. A liquid crystal compound as claimed in claim 1 and wherein R is an n-alkyl group having not more than 18 carbon atoms.

3. A liquid crystal compound as claimed in claim 1 and wherein R is a branched alkyl group having not more than 18 carbon atoms and containing a chiral centre.

4. A liquid crystal compound as claimed in claim 1 and wherein the integer n is one, the compound being a 1-[4' cyanophenyl]-4-alkyl substituted bicyclo [2.2.2] octane.

5. A liquid crystal compound as claimed in claim 1 and wherein the integer n is two, the compound being a 1-[4'-cyano-4''-biphenylyl]-4-alkyl substituted bicyclo [2.2.2] octane.

6. A liquid crystal compound as claimed in claim 4 and wherein R is an n-alkyl group having from 1 to 10 carbon atoms.

7. A liquid crystal compound as claimed in claim 4 and wherein R is an alkyl group having from three to 10 carbon atoms and containing a chiral centre.

8. A liquid crystal compound as claimed in claim 5 and wherein R is an n-alkyl group having from 1 to 10 carbon atoms.

9. A liquid crystal compound as claimed in claim 5 and wherein R is an alkyl group having from three to ten carbon atoms and containing a chiral centre.

10. A liquid crystal compound as claimed in claim 6 and wherein the compound is

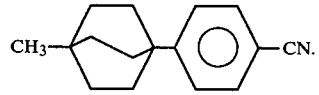

11. A liquid crystal compound as claimed in claim 6 and wherein the compound is

12. A liquid crystal compound as claimed in claim 6 and wherein the compound is

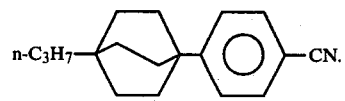

13. A liquid crystal compound as claimed in claim 6 and wherein the compound is

14. A liquid crystal compound as claimed in claim 6 and wherein the compound is

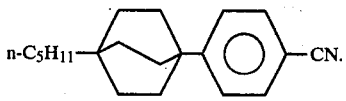

15. A liquid crystal compound as claimed in claim 6 and wherein the compound is

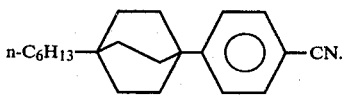

16. A liquid crystal compound as claimed in claim 6 and wherein the compound is

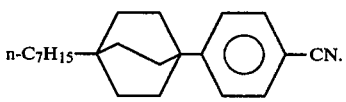

17. A liquid crystal compound as claimed in claim 8 and wherein the compound is

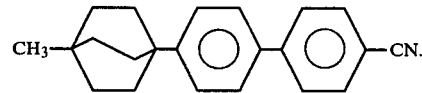

18. A liquid crystal compound as claimed in claim 8 and wherein the compound is

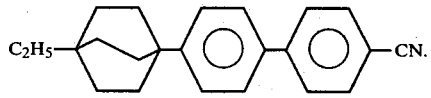

19. A liquid crystal compound as claimed in claim 8 and wherein the compound is

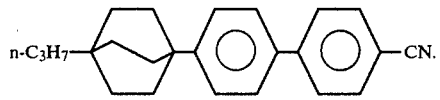

20. A liquid crystal compound as claimed in claim 8 and wherein the compound is

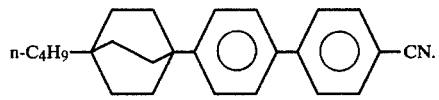

21. A liquid crystal compound as claimed in claim 8 and wherein the compound is

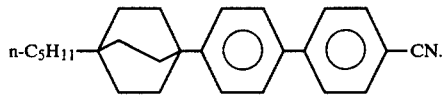

22. A liquid crystal compound as claimed in claim 8 and wherein the compound is

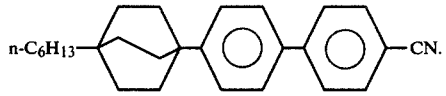

23. A liquid crystal compound as claimed in claim 8 and wherein the compound is

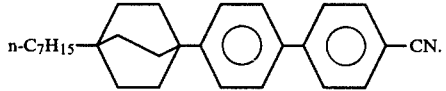

24. A liquid crystal compound material comprising a mixture of compounds at least one of which is a compound as claimed in claim 1.

25. A liquid crystal material comprising a mixture of compounds at least two of which are compounds as claimed in claim 1.

26. A liquid crystal material as claimed in claim 25 and wherein the mixture contains at least one compound of the form

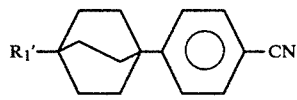

and at least one compound of the form

where $R'_1$ and $R'_2$ are n-alkyl groups.

27. A liquid crystal material as claimed in claim 24 and wherein the mixture contains at least one compound of the form

where $R'_3$ is an alkyl or alkoxy group.

28. An electro-optic liquid crystal device including two adjacent substrates at least one of which is optically transparent, a layer of liquid crystal material contained in the space between the substrates and, deposited on the inner facing surfaces of the substrates, a film of conducting material to allow an electric field to be applied across the layer and characterised in that the liquid crystal material includes a compound as claimed in claim 1.

29. A device as claimed in claim 28 and wherein the liquid crystal device is a twisted nematic effect device.

30. A device as claimed in claim 28 and wherein the liquid crystal device is a cholesteric-to-nematic phase change effect device.

* * * * *